United States Patent [19]
Tsuji et al.

[11] Patent Number: 5,139,718
[45] Date of Patent: Aug. 18, 1992

[54] METHOD OF MANUFACTURING PRODUCTS OF CERAMICS

[75] Inventors: Akihiro Tsuji, Gifu; Mitsugu Suzuki, Yokkaichi; Jyunichi Doi, Aichi; Shigeru Hanzawa, Kagamihara, all of Japan

[73] Assignee: NGK Insulators, Ltd., Japan

[21] Appl. No.: 492,119

[22] Filed: Mar. 13, 1990

[30] Foreign Application Priority Data

Mar. 13, 1989 [JP] Japan .................................. 1-58026

[51] Int. Cl.$^5$ ............................................. C04B 41/53
[52] U.S. Cl. ........................................ 264/63; 264/67
[58] Field of Search .................................... 264/63, 67

[56] References Cited

U.S. PATENT DOCUMENTS

| | | | |
|---|---|---|---|
| 4,369,154 | 1/1983 | Dougherty | 264/67 |
| 4,518,341 | 5/1985 | Suffa | 425/405.11 |
| 5,024,907 | 6/1991 | Ohshima | 264/340 |

FOREIGN PATENT DOCUMENTS

| | | |
|---|---|---|
| 0121128 | 5/1986 | European Pat. Off. |
| 3028296 | 3/1982 | Fed. Rep. of Germany |
| 2080725 | 2/1982 | United Kingdom |

*Primary Examiner*—James Derrington
*Attorney, Agent, or Firm*—Parkhurst, Wendel & Rossi

[57] ABSTRACT

A method of manufacturing a product of cermacis in which a green body is formed by isostatic pressing and an outer surface of the green body is polished by a buffing member before sintering, so that the utilization coefficient of a starting material of the product can be improved but the smoothness of the outer surface of the final product is the same as the smoothness of the outer surface of the conventional product.

11 Claims, 2 Drawing Sheets

FIG_1a
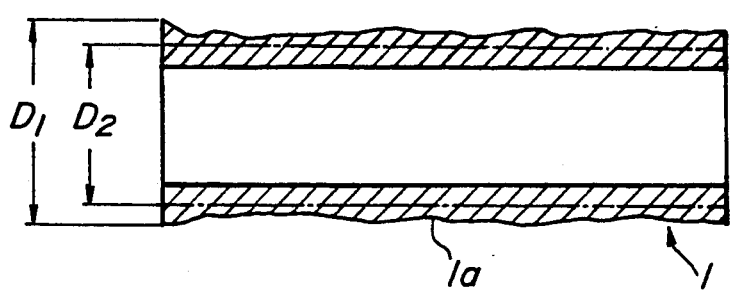
FIG_1b
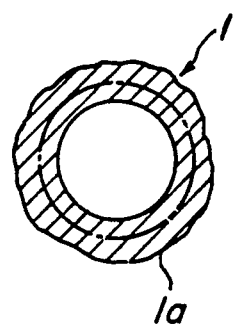
FIG_2
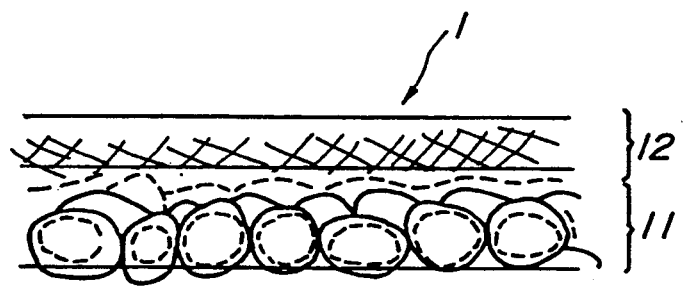

FIG_3
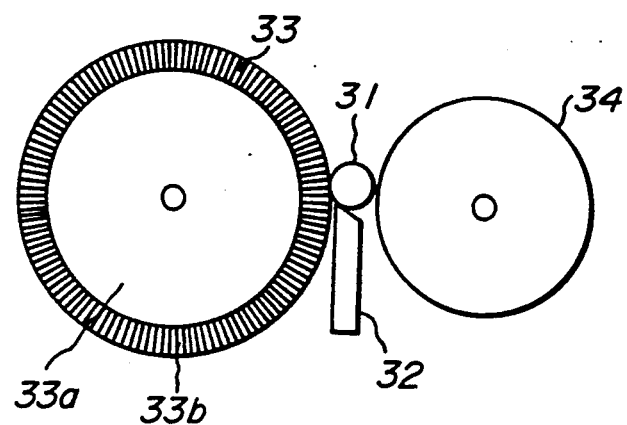
FIG_4
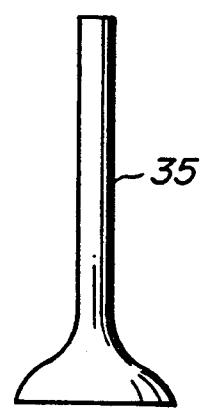

METHOD OF MANUFACTURING PRODUCTS OF CERAMICS

BACKGROUND OF THE INVENTION

Field of the Invention and Related Art Statement

The present invention relates to a method of manufacturing products of ceramics, and particularly relates to a method of manufacturing products having a cylindrical outer surface such as a translucent alumina tube for use in a high-voltage electric discharge lamp and a valve for use in automobile parts.

In a manufacturing process of the products of ceramics having a cylindrical shape or a columnar shape, granulated powder is molded by isostatic pressing such as hydrostatic pressing to obtain a green body. An outer surface of the green body is ground before sintering in order to make the surface smooth. In a grinding process of the green body, the outer surface thereof is generally ground by using a bite or a wheel around which a abrasive is provided. By grinding the outer surface of the green body with the bite or the wheel, a final product having uniformity in thickness and a smoothness on the outer surface thereof can be obtained. Particularly, in a manufacturing process of a translucent alumina tube for use in a high-voltage electric discharge lamp, it is necessary to make the outer surface of the green body smooth in order to obtain an alumina tube as the final product having a predetermined translucency. For this purpose, grinding with the bite o the wheel was generally conducted to finish the green body of the alumina tube.

FIGS. 1A and 1B are cross- and longitudinal-sectional views showing a green body 1 of the translucent alumina tube which has a cylindrical shape. According to the known grinding method for grinding the outer surface of the green body 1, in order to obtain a high roundness of the cylindrical body and a uniformity of thickness, the outer surface 1a of the green body 1 is ground by using the bite or the wheel to a degree that an unevenness formed on the outer surface is completely removed. That is to say, the outer surface of the green body 1 should be ground not only up to the minimum outer diameter of the cylindrical body but also up to the line shown by the reference D2 in FIGS. 1A and 1B, taking a margin for grinding into consideration.

However, such high roundness and uniformity of the thickness are not required to manufacture the product such as the translucent alumina tube for the high-voltage electric discharge lamp. In such tubes, if the sufficient translucency is obtained, the roundness of the body and the uniformity of the thickness do not effect to the efficiency of the tube. Therefore, only a smoothness of the outer surface 1a of the green body 1 is required to finish the green body. If the outer surface of the product such as the translucent alumina tube for use in the high-voltage electric discharge lamp is ground by the bite or the wheel, the utilization coefficient of the material of the product would be decreased. Furthermore, when the product is made by a brittle material such as ceramics, the grinding with the bite or the wheel would cause a crack on the outer surface 1a of the green body 1 and then the molded body 1 would be broken before or after sintering. The starting material of the translucent alumina tube is so expensive that the problem of the cracking was very serious in manufacturing the translucent alumina tube.

SUMMARY OF THE INVENTION

The present invention has for its object to provide a method of manufacturing a product of ceramics in which the outer surface of the product is polished by a buffing member to obtain a necessary smoothness. According to the invention, a utilization coefficient of the starting material for the product is not decreased, but a product whose outer surface has the same smoothness as that of a product ground by the known method can be obtained.

A method for manufacturing a product of ceramics according to the invention comprises the following steps:

isostatically pressing a mold of granulated powder to obtain a green body having an unevenness on an outer surface thereof;

polishing the outer surface of the green body along the unevenness; and sintering the green body to obtain a final product.

In order to make the outer surface of the green body smooth without regard to the unevenness thereon, it may be sufficient to remove only an outermost surface layer of the green body. Therefore, in the present invention, only a little of the outermost surface layer of the green body is removed by buffing with a non woven fabric or a brush wheel having a contour along the unevenness instead of by grinding with the bite or the wheel which have a high stiffness. Thus, it is possible to obtain a smooth outer surface on the green body without reducing the utilization coefficient of the starting material.

FIG. 2 is a schematic view showing the outer surface layer of the green body 1 in a large scale. The outermost surface layer of the green body 1 is constituted by a granulated particle layer 11. The granulated particle layer 11 is formed on a particle destruction layer 12 as shown in FIG. 2. Particles constituting the granulated particle layer 11 are granulated by using a spray dryer. The thickness of the granulated particle layer 11 is in a range of about 50–100 $\mu$m. In order to obtain a smoothness on the outer surface of the green body 1, it is enough to remove only the granulated particle layer 11 formed on the destruction layer 12 along the unevenness of the outer surface of the green body 1. It should be noted that it is not necessary to remove all of the granulated particles 11 formed on the destruction layer 12, but about 10–30 $\mu$m of the particles should be removed in order to obtain the smooth outer surface.

According to the method of the invention, a margin for grinding the outer surface of the green body is not necessary to be taken into consideration and it is possible to form the shape of the green body similar to the shape of the final product. Therefore, the utilization coefficient of the starting material is greatly increased.

BRIEF DESCRIPTION OF THE DRAWINGS

FIGS. 1A and 1B are cross- and longitudinal-sectional views of a cylindrical tube;

FIG. 2 is a schematic view depicting the outermost surface layer of the cylindrical tube shown in FIGS. 1A and 1B;

FIG. 3 is a schematic view illustrating a centerless grinder to which the present invention is applied; and FIG. 4 is a schematic view representing a bulb.

DETAILED DESCRIPTION OF THE PREFERRED EMBODIMENTS

FIG. 3 is a schematic view illustrating a centerless grinder by which an outer surface of a product having a cylindrical shape is polished under the application of the present invention. In FIG. 3, the numerical number 31 denotes a green body to be polished, 32 a supporting portion for supporting the green body 31, 33 a buff wheel to polish the outer surface of the molded body 31, and 34 an adjustable wheel for urging the green body 31 against the buff wheel 33.

EXAMPLE 1

To alumina powder of 100 weight percent having an average particle diameter of 0.3 μm, is added magnesium oxide (MgO) of 0.10 weight percent as a sintering assistant. Thereafter, the alumina powder and the magnesium oxide are mixed with a binder in a mixing attrition mill for one hour. The thus obtained mixture is granulated by a spray dryer to obtain granular powder having an average particle diameter of 80 μm. The thus obtained granular powder is hydrostatic-pressed by using a rubber mold having a thickness of 5 mm and a core under a pressure of 2 ton/cm$^2$ to obtain a green body 31 having a cylindrical shape. The molded body 31 is placed on the supporting portion 32 and the outer surface thereof is polished by rotating the buff wheel 33 under the adjustment of the adjustable wheel 34.

A buffing condition is as follows: The buff wheel 33 comprises a round body 33a made by an alloy of aluminum and a buffing member 33b made of nylon (Scotch Bright—trade mark) having a thickness of 5 mm. The buffing member 33b is arranged around the outer circumference of the round body 33a. Buffing is conducted under the condition that the rotational frequency of the buff wheel 33 is 1,200 rpm, the peripheral speed of the buff wheel 33 is 940 m/min, the feeding speed for feeding the molded body 31 is 44 mm/sec, and the distance between the buff wheel 33 and the adjustable wheel 34 is set at 5-20 m. After polishing, the molded body is preliminarily sintered in air and then primarily sintered for one hour in an ammonia decomposed atmosphere of 70-80 Aq under a temperature of 1,900° C. to obtain the final product.

The thus obtained translucent alumina tube, a comparative alumina tube to which no buffing is applied, and a conventional alumina tube whose outer surface is ground by using a bite are prepared, and a linear transparency, a white light transparency and a maximum surface roughness of these alumina tubes were measured. The measurement result is mentioned in the following Table 1.

TABLE 1

|  | Linear transparency (%) | Total light transparency (%) | Max. surface roughness R$_{max}$ μm |
|---|---|---|---|
| Present invention | 2.5 | 97 | 3~5 |
| Conventional example | 2.5 | 97 | 3~5 |
| Comparative example | 0.7 | 96 | 10~15 |

From the result mentioned in Table 1, it is proved that the linear transparency, total light transparency and smoothness of the alumina tube, manufactured according to the present invention are the same as those of the conventional example tube the outer surface of which was ground by the bite.

EXAMPLE 2

FIG. 4 is a schematic view showing a valve 35 which is manufactured under the application of the present invention. Ten kilograms of a starting material consisting of silicon nitride powder of 93 weight percent having an average particle diameter of 0.5 μm, aluminum oxide (Al$_2$O$_3$) of 4 weight percent, and Y$_2$O$_3$ of 3 weight percent is prepared. The starting material is mixed with 15 Kg of water in a wet-type mixing attrition mill for one hour to obtain a slurry. To the thus obtained slurry is added and mixed a polyvinyl alcohol of 3 weight. Then, the slurry is granulated by a spray dryer to obtain granular particles having an average particle diameter of 60 μm. The thus obtained granular particles are hydrostatic-pressed by using a rubber mold having a thickness of 5 mm under a pressure of 2.0 ton/cm$^2$ to form a green body. The outer surface of the green body is polished by the buff wheel 33 under the same condition of the first example. Thereafter, the green body is preliminarily sintered in air at a temperature of 500° C. for 5 hours, in order to remove the polyvinyl alcohol included in the green body. Then, the preliminarily sintered body is primarily sintered in a nitride atmosphere of 20 atm at a temperature of 1,800° C. for one hour to obtain a valve 35 as a final product.

The valve whose surface is polished in accordance with the method of the present invention, a comparative example valve which is sintered without being ground, and a conventional valve whose outer surface is ground by using a bite are prepared and the maximum surface roughnesses of the respective valves are compared to each other. The comparative result is mentioned in Table 2.

TABLE 2

|  | Maximum surface roughness R$_{max}$ (μm) |
|---|---|
| Present invention | 5~10 |
| Conventional example | 5~10 |
| Comparative example | 10~25 |

From Table 2, it is proved that the valve manufactured by the method of the present invention has the same smoothness as that of the conventional example valve.

The present invention is not limited to the embodiments stated above but many alterations and variations can be applied. For instance, if the method of the present invention is applied to a general machine for making a cylindrical shape such as a cylindrical grinder, etc., the utilization coefficient of the starting material can be greatly increased. Further, it would be possible to prevent to causing a crack on the surface of the product and thus it is expected to increase the yield. It should be noted that by dropping a wetting agent to the buff wheel 33 depending upon the kind of the work to be ground, the surface of the final product would become smoother.

What is claimed is

1. A method of manufacturing a ceramic product, comprising the following steps:
    isostatically pressing a mold of granulated powder to obtain a green body which includes a cylindrical portion, said cylindrical portion having an uneven outer surface which comprises a granulated particle layer;

polishing an entire periphery of the outer surface of said cylindrical portion to remove part of the granulated particle layer thereby only partially removing the uneven outer surface; and sintering the green body to produce a final product wherein the uneven outer surface is not ground before said polishing.

2. The method of claim 1, wherein an amount of the granulated particle layer removed ranges from 10–30 μm.

3. The method of claim 1, wherein the polishing step is conducted by using a buffing member.

4. The method of claim 3, wherein said buffing member comprises a wheel around which a brush made of nylon is provided.

5. The method of claim 3, wherein said buffing member comprises a non-woven fabric of nylon.

6. The method of claim 5, further comprising applying a wetting agent between said buffing member and the green body during the polishing step.

7. A method of manufacturing a ceramic product, comprising the following steps:

isostatically pressing a mold of granulated powder to obtain a green body which includes a cylindrical portion, said cylindrical portion having an uneven outer surface which comprises a granulated particle layer;

polishing an entire periphery of the outer surface of said cylindrical portion while applying a wetting agent to the green body, for removing an amount of the granulated particle layer thereby only partially removing the uneven outer surface;

preliminarily sintering the green body; and sintering the green body to produce a final product wherein the uneven outer surface is not ground before said polishing.

8. The method of claim 7, wherein a temperature for the sintering of the green body ranges from 1,800°–1,900° C.

9. The method of claim 7, wherein the amount of the granulated particle layer removed ranges from 10–30 μm.

10. The method of claim 7, wherein the granulated powder comprises $Al_2O_3$.

11. The method of claim 10, wherein the granulated powder further comprises sintering aids selected from the group consisting of MgO and $Y_2O_3$.

* * * * *